Jan. 25, 1944.   M. MICHEL   2,339,939
CONTROL SYSTEM
Filed July 3, 1940
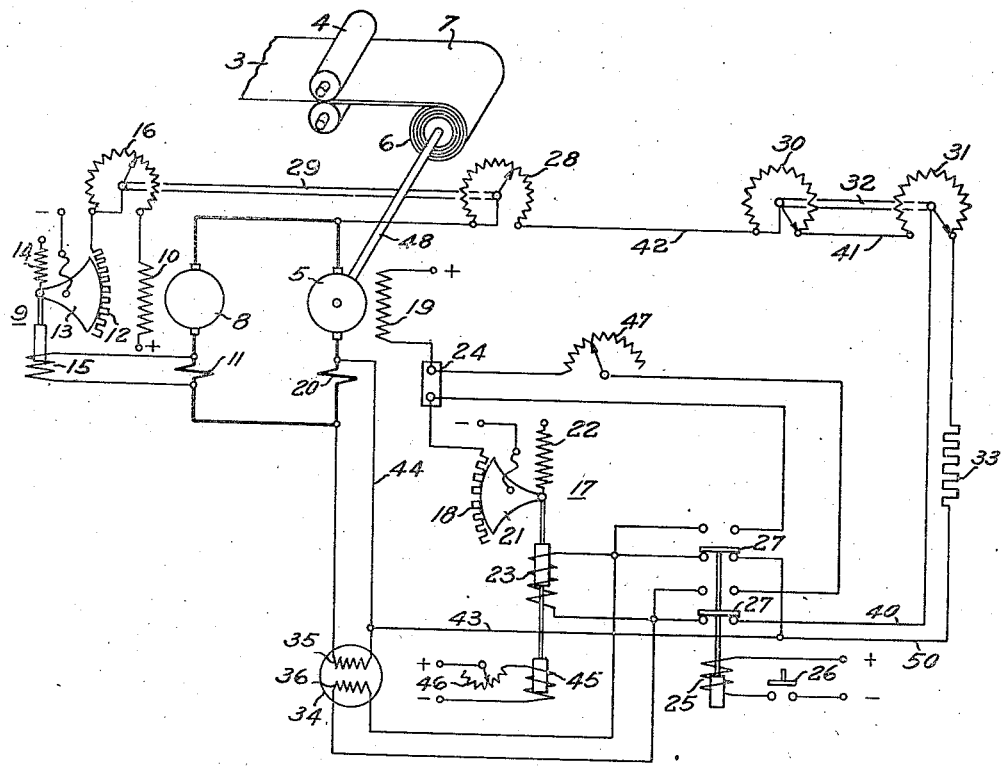
Inventor
M. Michel
by
Attorney

Patented Jan. 25, 1944

2,339,939

UNITED STATES PATENT OFFICE 2,339,939

CONTROL SYSTEM

Mathias Michel, Wauwatosa, Wis., assignor to Allis-Chalmers Manufacturing Company, Milwaukee, Wis., a corporation of Delaware Application July 3, 1940, Serial No. 343,720

13 Claims. (Cl. 80—32)

This invention relates in general to control systems and relates particularly to an improved control system for dynamo electric machines utilized for reeling or unreeling strip material.

A dynamo electric machine connected to a winding or unwinding reel for strip material has been controlled to maintain the power thereof constant for a predetermined strip speed in order that a constant tension be maintained on the strip of material. When a regulator utilized for such control is responsive to a characteristic of the dynamo electric machine available only when such machine is rotating, such regulator cannot be utilized to regulate the tension at zero strip speed.

It is therefore an object of the present invention to provide in a control system for a dynamo electric machine utilized for reeling or unreeling strip material, a regulator so connected that it can be utilized in a new and improved manner for controlling the tension in the strip material both while the material is being reeled or unreeled and while it is at standstill.

It is another object of the present invention to provide a control system, utilizing a regulator which provides for a constant tension in a strip of material during its pass through operating rolls, with a means for utilizing such regulator for maintaining a constant torque on the tensioning dynamo electric machine at mill standstill.

It is a further object of the present invention to provide, in a control system for a strip mill, a new and improved means for compensating a tension regulator for the increase in length in the strip due to reduction in the thickness thereof as it goes through the operating rolls.

It is another object of the present invention to provide an improved manner of indicating the tension in said strip material.

Objects and advantages other than those above set forth will be apparent from the following description when read in connection with the accompanying drawing, in which the single figure is a schematic diagram of connections of a control system embodying the present invention.

In the drawing, a dynamo electric machine 5 is shown mechanically connected to a reel 6 on which a strip 7 may be wound or unwound. The machine 5 may be a motor or a generator depending upon whether the strip 7 is being wound or unwound. A second dynamo electric machine 8 has its armature connected in series with that of the machine 5. If the machine 5 is operating as a motor, the machine 8 will be a generator supplying the same. If machine 5 is operating as a braking generator, the machine 8 may be a generator or a motor depending upon whether other machines are being supplied from the same circuit.

In the specific embodiment shown in the drawing, a constant power is maintained on the machine 5 for any given speed and reduction of the strip 7. This constant power is maintained primarily by action of the two regulators 9 and 17. The regulator 9 acts on the field 10 of the machine 8 and has a coil 15 operatively responsive to the current in the series circuit connecting the armatures of the machines 8 and 5. The coil 15 of regulator 9 is connected across the interpole winding 11 of the machine 8.

An increase in the armature current of the machine 5 increases the current in the coil 15 to rock the sector 13 downwardly against the bias of the spring 14. This increases the amount of resistance 12 connected in circuit with the field 10, thereby decreasing the voltage of the machine 8 and decreasing the current flowing through the armature of machine 5. The regulator 9 therefore balances at a given value of current in the armature of the machine 5 and acts to maintain this current constant.

The regulator 17 of the dynamo electric machine 5 operates, when the contacts 27 are in the position shown in the drawing, to maintain the voltage across the terminals of the machine 5 constant for any predetermined value of the speed and reduction of the strip 7. By maintaining the armature current of the machine 5 constant and by also maintaining the voltage across its terminals constant, a constant power is delivered to the shaft 48 connecting the machine 5 to the reel 6, thereby providing a constant tension.

When the mill is running, and the strip 7 is being fed through the rolls 4, the coil 23 of the regulator 17 is connected by the contacts 27 across resistor 33 which produces a voltage proportional to the voltage across the terminals of the machine 5. Resistor 33 is connected to the upper terminal of machine 5 through the resistance of rheostat 31, conductor 41, rheostat 30, conductor 42 and rheostat 28, and is connected to the lower terminal of machine 5 by the conductors 50, 43 and 44. An increase in the voltage across machine 5 will increase the voltage across the resistor 33 and therefore the current of the coil 23, thereby moving the sector 21 of the regulator 17 downwardly against the bias of the spring 22. This increases the amount of resistance 18 in circuit with the field 19 of the machine 5, thereby decreasing its field current and decreasing its voltage until the bias of spring 22 balances the pull of coil 23.

Under stall tension conditions, that is when the strip speed is zero and the mill is stopped, the voltage across the terminals of the machine 5 will only be that of the IR drop therethrough. In order to provide a proper tension under stall conditions, energization of the relay coil 25 by means of the switch 26, operates contacts 27 to their upper position. This connects the coil 23 of the regulator 17 across a shunt or resistance 24 in the circuit of the field 19 in series with an adjustable resistance 47.

The regulator 17 now controls the current in the field 19 to maintain the same constant at a constant value. With the regulator 9 supplying a constant current through the armature of the machine 5 and the constant flux provided by the field 19, a constant torque will be maintained on the machine 5. The regulator 17 may thus be utilized to provide a constant tension both under running conditions of the mill and during the time the mill is at standstill.

By using the same regulator to control tension both during running and stall conditions, several important advantages are gained. The regulator moving parts are in proper regulating position at all times. Therefore upon changeover of the main coil 23, no time is lost (and its subsequent momentary loss of tension) in bringing the regulator into its new service. Another advantage is the adjustability of the stall tension for thin or thick strips and the obtaining of this adjustment by the same means (usually in the mill operator's pulpit) utilized for adjusting the running tension. A further advantage is that an indication of the running tension setting is permitted at standstill.

If the mill speed and hence the speed of strip 7 is changed by adjustment of the rheostat 16, a comparable change must be effected in the resistance of the circuit of resistor 33, in order to maintain the tension constant. This change of resistance is obtained by operation of the rheostat 28 which has a mechanical connection 29 connecting it to rheostat 16.

If the strip 7 is reduced in thickness by the action of rolls 4 and is thereby elongated, a further compensation is necessary in order to maintain the tension constant and to return the regulator 17 to a balanced condition. As an example, consider the operation of the control system when the reel 6 is unwinding (and therefore the machine 5 is operating as a braking generator) and the reduction is changed by the mill operator from zero to 50%. If no change in the speed of the rolls 4 is made, the lineal speed of strip 7 immediately drops to substantially one-half that of strip 3. The speed of machine 5 is therefore cut in half and as the generated voltage varies with the speed, the voltage drops to one-half. With the current maintained constant by regulator 9, half voltage will produce one-half the prior power output of machine 5, which, at half speed, will result in the same tension.

The regulator 17, unless compensated or corrected, will be out of balance and will try to raise the voltage of machine 5 back to full voltage, for the voltage across regulator coil 23 will have dropped to one-half. This correction of the voltage across coil 23 is effected by increasing the effective resistance of resistor 33 in the circuit of coil 23 without changing the total resistance of the circuit across the terminals of machine 5. The effective resistance of resistor 33 is increased by movement of rheostat 31 in a counterclockwise direction, thus inserting more resistance in the circuit of coil 23 and increasing the percent armature voltage of machine 5 impressed on coil 23. This increase will be proportional to the movement of rheostat 31, and if such movement is proportional to the percent reduction of the strip, the tension will remain constant for a given setting of the tension adjusting rheostat 46. The rheostat 31 is set in accordance with the percent reduction of the strip, either manually or by any well known reduction responsive device, for example, such as shown in Patent No. 2,051,018, L. A. Umansky, August 11, 1936, Speed ratio indicating device.

The correction of voltage across coil 23, so that it is again at the same value as prior to the 50% reduction in strip 7, provides for the same current in field 19 and again balances the regulator 17. With the same flux and a constant armature current in machine 5, half voltage provides half power, which at half strip speed gives the same tension as was provided at zero reduction. In the above explanation of reduction compensation, action of the regulator 17 due to reel diameter change has been omitted for purposes of clarity of explanation, for such regulation is automatic and is independent of reduction compensation.

In order that the effect of a change in the speed compensating rheostat 28 may be the same independently of the reduction setting of rheostat 31, an additional rheostat 30 is provided. Rheostat 30 is in tandem with rheostat 31 and the resistance of one is increased as the resistance of the other is decreased. In this manner, the resistance of the control circuit from conductor 42 to conductor 43 is maintained constant, and the effect of the speed compensation is the same regardless of the percent reduction. Inasmuch as the tension is adjusted by adding or subtracting ampere turns pull on the regulator element by increasing or decreasing the energization of coil 45, the compensation for reduction has no effect on the tension setting of rheostat 46.

A tension indicating device 34 of the wattmeter type, has its current coil 35 connected across the interpole winding 20 of machine 5 and its potential coil connected in parallel with the main coil 23 of the regulator 17. This permits the device 34 to indicate electrically a power proportional to the power of machine 5 and hence the true tension for any position of the adjusting rheostat 46 and while machine 5 is running. A change in the draft or reduction compensating rheostat 31 changes neither the tension nor the tension indicator 34. As the voltage drop across the coil 23 remains the same for any given position of the tension adjusting rheostat 46 (with the regulator balanced), regardless of whether the coil 23 is connected across the machine 5 or across the shunt 24, the indicator 34 will indicate the running tension setting while the mill is at standstill.

For the purpose of disclosing the draft compensation control, the machine 5 has been shown as a braking generator attached to reel 6 from which the strip 7 is being unwound. The machine 5 may, however, be a winding motor attached to a winding reel, or to a tensioning roll, or to one stand or a multistand mill and utilize the tension control and indication above disclosed. For utilization of the disclosed control of power and torque under running and stall conditions, the machine 5 may be motor or generator connected mechanically to any load or source of power.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a control system, a reel for strip material, a dynamo electric machine connected in power transmitting and receiving relation to said reel, means for controlling said dynamo electric machine to maintain a characteristic of said power transmission substantially constant for a predetermined speed of said strip, and means for utilizing said controlling means to maintain another characteristic of said power transmission substantially constant when the speed of said strip is zero.

2. In a control system, a load, a motor mechanically connected to said load, means for controlling said motor to maintain constant the power transmitted to said load by said motor at a predetermined speed thereof, said means comprising an electromagnetic regulator provided with an operating member biased against a force proportional to said transmitted power, and means for utilizing said regulator to maintain constant the torque transmitted by said motor to said load when said motor is at standstill.

3. In a control system, a power supply, a generator mechanically connected to said power supply, means for controlling said generator to maintain constant the power transmitted thereto by said power supply at a predetermined generator speed, said means comprising an electromagnetic regulator provided with an operating member biased against a force proportional to said transmitted power, and means for utilizing said regulator to maintain constant the torque transmitted by said power supply to said generator when said generator is at standstill.

4. In a control system, a reel for a strip of material, a first dynamo electric machine mechanically connected to said reel, a second dynamo electric machine electrically connected to said first dynamo electric machine, means for controlling said dynamo electric machines to maintain the power transmitted therebetween proportional to the speed of said strip at any finite value thereof, said means comprising a regulator electrically connected to one of said dynamo electric machines and controlling the field current of said first dynamo electric machine, and means for reconnecting said regulator to maintain said field current constant when said strip speed is zero.

5. In a control system, a dynamo electric machine, means for maintaining constant the armature current in said machine, means comprising a regulator connected responsively to the voltage of said machine for controlling the field current of said machine to maintain its voltage constant, and means for reconnecting said regulator to respond to the value of said field current to maintain said field current constant.

6. In a control system, a reel for a strip of material, a first dynamo electric machine mechanically connected to said reel, a second dynamo electric machine having its armature electrically connected to the armature of said first dynamo electric machine, means for controlling the field current of said second dynamo electric machine to maintain the current flowing between said dynamo electric machines substantially constant, means for controlling the field current of said first dynamo electric machine in response to a change in voltage across its terminals, and means reconnecting said last named controlling means to control said field current in response to a change therein to maintain the same substantially constant.

7. In combination, a strip of material, an unwinding reel for said strip, reducing elements for said strip, a dynamo electric machine connected to said reel, means for tensioning said strip between said reel and said elements comprising a regulator for maintaining the generated power of said dynamo electric machine substantially constant for a predetermined speed of said reducing elements, said regulator comprising a coil connected responsively to the terminal voltage of said machine, and means for controlling the percent armature voltage to which said regulator coil responds in accordance with the percent reduction of said strip by said reducing elements.

8. In combination, a strip of material, an unwinding reel for said strip, reducing elements for said strip, a dynamo electric machine connected to said reel, means for tensioning said strip between said reel and said elements comprising a regulator for maintaining the generated power of said dynamo electric machine substantially constant for a predetermined speed of said reducing elements, said regulator comprising a coil connected responsively to a percentage of the terminal voltage of said machine, and means for controlling the percent armature voltage to which the said regulator coil responds in accordance with the percent reduction of said strip, and a tension indicating means provided with a coil connected responsively to the voltage across said regulator coil.

9. In combination, a strip of material, a reel from which said strip unwinds, reducing elements for said strip, a dynamo electric machine connected to said reel, a resistor connected in circuit with said dynamo electric machine, means for tensioning said strip between said reel and said elements comprising a regulator for maintaining the generated power of said dynamo electric machine substantially constant for a predetermined speed of said reducing elements, said regulator comprising a coil connected responsively to the voltage across said resistor, a first rheostat in circuit with said resistor for varying the resistance to which said coil is responsive, and means comprising a second rheostat for maintaining constant the total resistance of said resistor and said first rheostat in circuit with said dynamo electric machine.

10. In a control system, a reel for strip material, a dynamo-electric machine, means connecting said reel and said dynamo-electric machine for transmission of power therebetween, means for controlling said dynamo-electric machine to maintain a predetermined constant power transmitted between said reel and dynamo-electric machine at a predetermined speed of said strip, and means for utilizing said controlling means for maintaining a predetermined constant torque transmitted between said reel and said dynamo-electric machine when said strip is stopped.

11. In a control system, a reel for strip material, a dynamo-electric machine, means connecting said reel and said dynamo-electric machine for transmission of power therebetween, means comprising an electro-magnetic regulator provided with a movable element to maintain at a predetermined constant value the power transmitted between said reel and said dynamo-electric machine for any predetermined value other than zero of the speed of said strip, and means whereby said regulator maintains constant the value of the torque transmitted between said reel and said dynamo-electric machine at zero value of said strip speed.

12. In a control system, a reel for a strip of material, a dynamo electric machine connected to said strip, means for controlling the excitation of said dynamo electric machine to maintain the tension in said strip constant at any predetermined finite value of speed of said strip, said means comprising a regulator provided with a main coil connected responsively to an electrical characteristic of said dynamo electric machine, means for adjusting the value at which said tension is maintained constant, and indicating means comprising a coil connected responsively to the energization of said main coil for indicating the tension in said strip while said strip is moving and for indicating the setting of said adjusting means when the speed of said strip is zero.

13. In a control system, a set of mill rolls, a reel, a strip of material connecting said reel and rolls, a dynamo electric machine connected to said reel, means for controlling the excitation of said dynamo electric machine to tension said strip between said reel and said rolls while said mill rolls are running and at standstill, said means comprising a regulator provided with a main coil connected responsively to an electrical characteristic of said dynamo electric machine, and means comprising a coil connected responsively to the energization of said main coil for indicating while said mill is at standstill the running tension for which said controlling means is set.

MATHIAS MICHEL.